Feb. 22, 1966  H. O. BENDER  3,235,970
TOE GAUGE FOR VEHICLE WHEELS
Filed Feb. 11, 1963  2 Sheets-Sheet 1
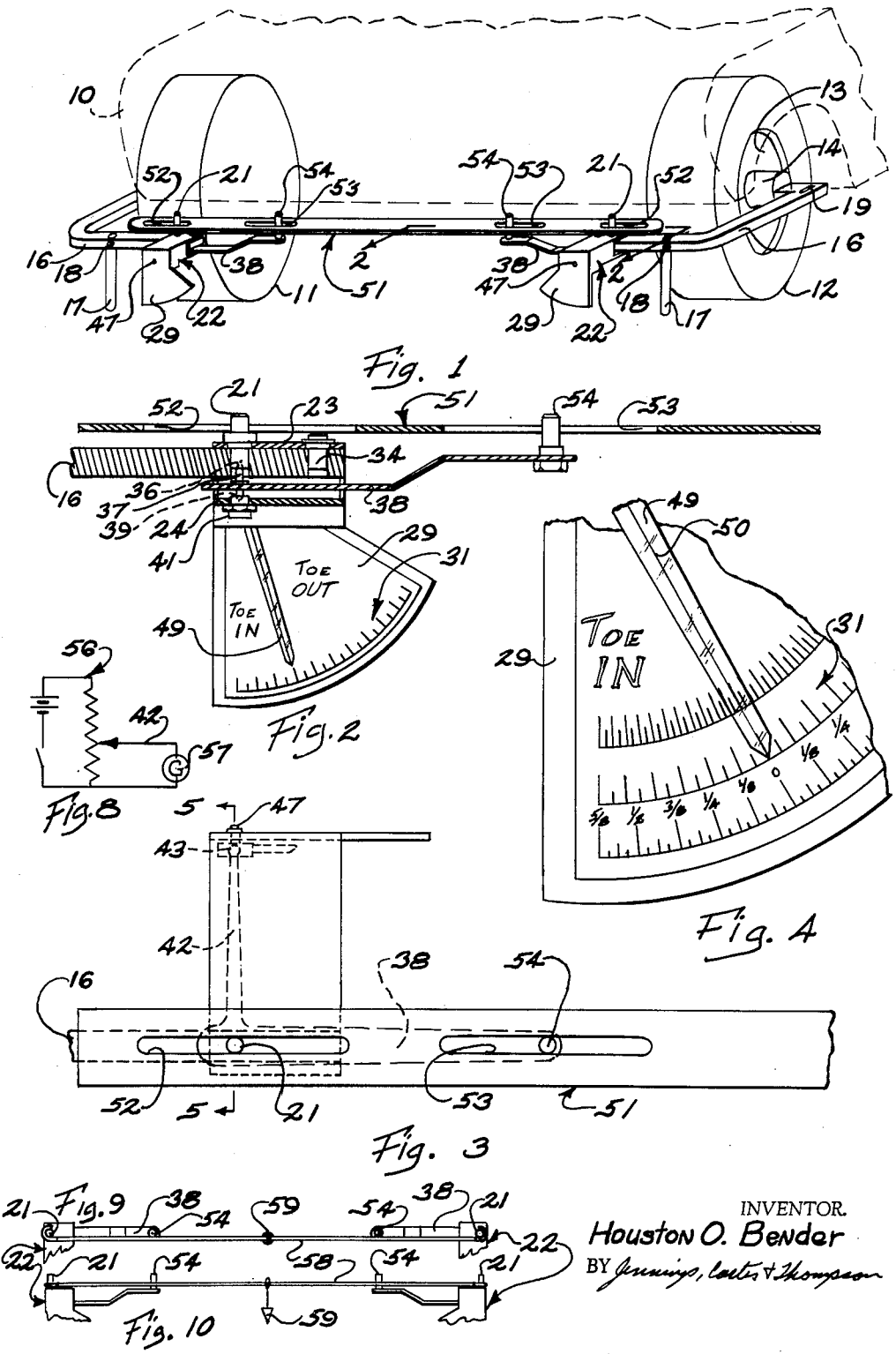
INVENTOR.
Houston O. Bender
BY *Jennings, Carter & Thompson*

Feb. 22, 1966 H. O. BENDER 3,235,970
TOE GAUGE FOR VEHICLE WHEELS
Filed Feb. 11, 1963 2 Sheets-Sheet 2
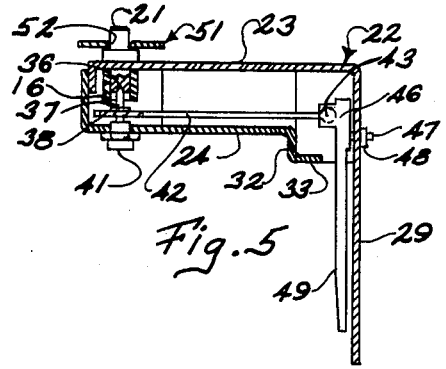
Fig. 5
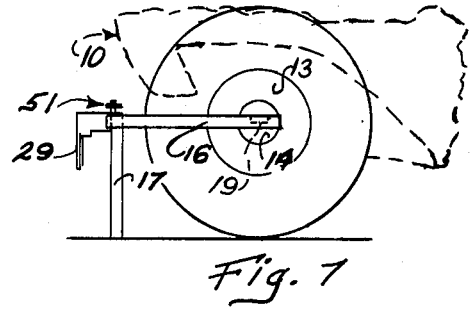
Fig. 7
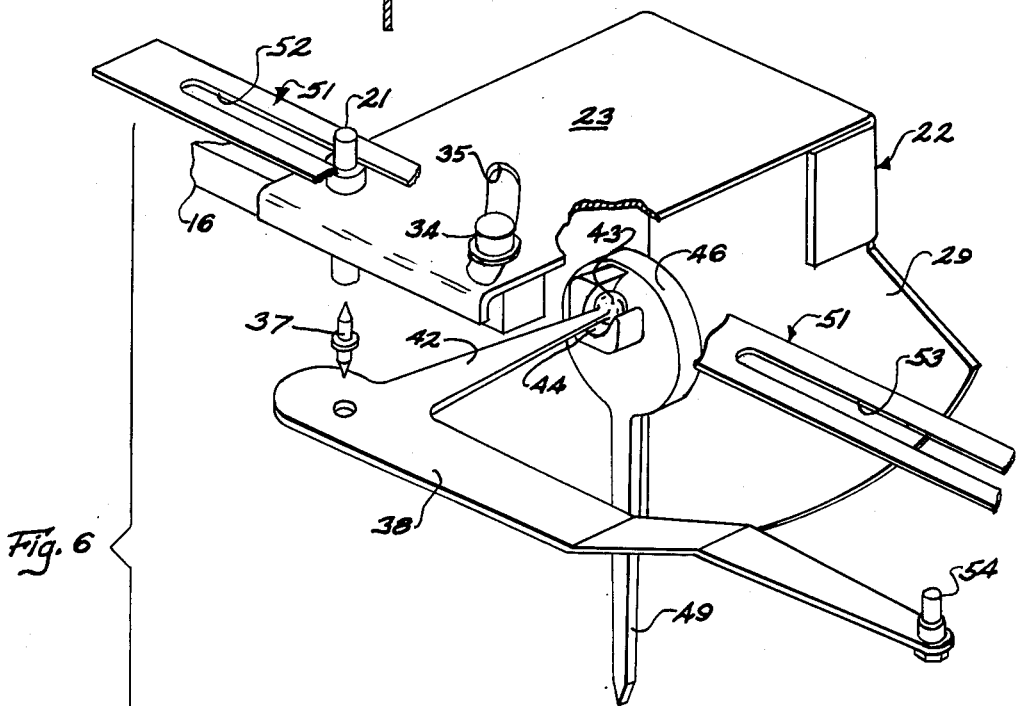
Fig. 6
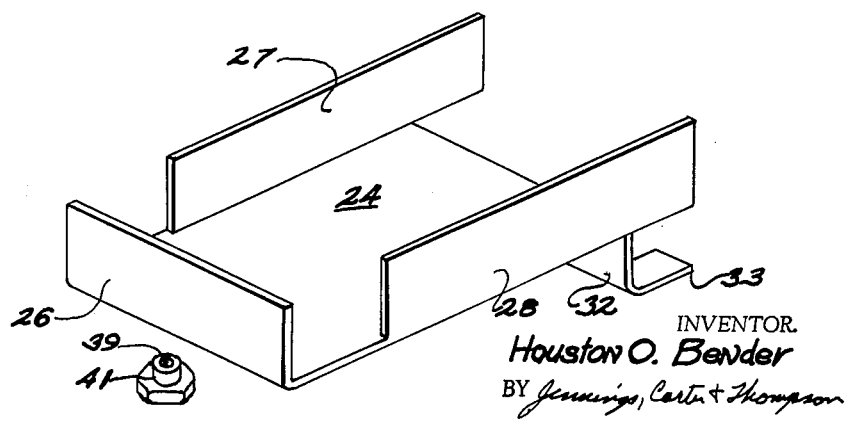
INVENTOR.
Houston O. Bender
BY Jennings, Carter & Thompson

United States Patent Office 3,235,970
Patented Feb. 22, 1966

3,235,970
TOE GAUGE FOR VEHICLE WHEELS
Houston O. Bender, 2315 N. 26th St., Birmingham, Ala.
Filed Feb. 11, 1963, Ser. No. 257,477
15 Claims. (Cl. 33—203.17)

This invention relates to a toe gauge for vehicle wheels and more particularly to such a wheel alignment measuring device which is applied directly to the wheel hubs of a pair of wheels and which operates independently of both the wheels and tires therefor whereby the measurements obtained show the actual toe-in or toe-out, if there be any, and the amount of such toe.

An object of my invention is to provide a toe gauge for vehicle wheels which gives a continuous reading while adjustments are being made whereby the operator can determine the change in toe readings as corrections are made.

Another object of my invention is to provide a toe gauge for vehicle wheels of the character designated in which the amount of toe may be read for the wheels separately or collectively in that the toe reading for both gauges can be read from either side of the vehicle being tested.

Another object of my invention is to provide a toe gauge for vehicle wheels of the character designated in which the linear motion imparted to a lever arm where there is toe-in or toe-out is transposed to angular motion of an indicator unit whereby the amount of toe is indicated by a pointer and scale.

A further object of my invention is to provide a toe gauge for vehicle wheels of the character designated which shall be simple of construction, economical of manufacture and one which may be operated with a minimum of effort to obtain accurate toe measurements.

As is well known in the art to which my invention relates, the front wheels of an automobile must have a certain amount of toe so that the vehicle will track properly. That is, the front wheels of a vehicle are usually set whereby they will be from one-eighth to one-quarter inch closer together or farther apart at the front than at the rear. This not only makes the vehicle easier to steer but compensates for the tendency of the wheels to spread when the vehicle is being operated at high speeds and reduces tire wear to a minimum.

Heretofore, in the art to which my invention relates, many devices have been proposed for measuring toe. However, with such gauges it is very difficult for the operator to make the adjustments and read the gauge at the same time due to the fact that the instruments cannot be read while the operator is beneath a vehicle. Also, such devices do not give a continuous reading whereby the operator can always determine the exact amount of toe-in or toe-out by merely glancing at the gauges while adjustments are being made. Furthermore, such devices heretofore employed have not been adapted for reading the amount of toe for the front wheels both individually and collectively.

Briefly, my improved toe gauge comprises a pair of arms which are removably attached to the hubs of the front wheels in position for an arm to project forwardly of each of the front wheels. The forward portions of the arms are operatively connected to each other by an elongated member and indicator means is associated therewith to transpose linear movement of the elongated member relative to the arms into angular movement of the indicator means whereby continuous toe readings are produced. To make the device readable while the adjustments are being made to the vehicle, I mount the toe gauges in position for the indicator mechanism therefor to face the operator.

Apparatus embodying features of my invention is illustrated in the accompanying drawings, forming a part of this application, in which:

FIG. 1 is an isometric view showing the apparatus in operating position;

FIG. 2 is an enlarged fragmental view taken generally along the line 2—2 of FIG. 1;

FIG. 3 is a top plan view of the apparatus shown in FIG. 2;

FIG. 4 is a fragmental view showing one form of scale which may be employed to indicate toe-in or toe-out;

FIG. 5 is a sectional view taken generally along the line 5—5 of FIG. 3;

FIG. 6 is an exploded view of the apparatus shown in FIG. 5;

FIG. 7 is a side elevational view showing the apparatus attached to the wheels of a vehicle;

FIG. 8 is a diagrammatic view showing a modified form of my toe gauge;

FIG. 9 is a top plan view, partly broken away, showing a further modification; and, FIG. 10 is a side elevational view of the apparatus shown in FIG. 9, partly broken away.

Referring now to the drawings for a better understanding of my invention, I show my improved apparatus associated with a vehicle indicated generally at 10 having front wheels 11 and 12. Each of the wheels 11 and 12 is provided with a hub portion 13 having an outer machined face.

Secured removably to each of the machined faces of the hub 13 is a magnetic chuck 14 which supports an arm 16 which extends forwardly alongside the wheels 11 and 12, as shown in FIGS. 1 and 7. The forward portion of each of the arms 16 is curved inwardly whereby it extends forwardly of each of the front wheels 11 and 12, as shown in FIG. 1. The forward ends of the arms 16 are supported by adjustable legs 17 which are held in selected positions by suitable means, such as by set screws 18. A spirit level 19 is mounted on each of the arms 16 whereby the arms 16 may be adjusted to a horizontal poistion by varying the effective lengths of the legs 17.

Secured to the forward, inner ends of each of the arms 16 is an upwardly projecting pin 21. Also, secured to the forward inner ends of the arms 16 is a housing indicated generally at 22 which comprises a top portion 23, a bottom 24, a front side 26 and side members 27 and 28. Formed integrally with the top portion 23 is a depending end portion 29 which defines a surface for a scale indicated generally at 31. Preferably, the bottom wall 24, end wall 26 and side walls 27 and 28 are formed integrally with each other, as shown in FIG. 6. Also, the bottom wall 24 is provided with a downwardly extending portion 32 which terminates in a horizontal portion 33. The top portion 23 is secured to the arm 16 by means of the pin 21 and a stud pin 34 which passes through an arcuate opening 35 provided in the top portion. By providing the arcuate opening 35, the position of the arm 16 relative to the housing may be adjusted to compensate for any misalignment of the apparatus such as might be caused by a bent arm or the like. Accordingly, the apparatus may be calibrated and then locked in the proper position.

As shown in FIG. 5, the lower end of the pin 21 is provided with a conical recess 36 which flares in a downward direction to receive the upper pointed end of a pivot pin 37 which in turn is secured to an elongated lever arm 38. The lower end of the pivot pin 37 is also pointed whereby it fits within a conical recess 39 carried by a bearing support member indicated generally at 41. Accordingly, each elongated lever arm 38 is adapted for free pivotal movement about a point which is in axial alignment with its associated pin 21. The bearing support member 41 is secured to the bottom wall 24, as shown in FIG. 5.

Secured to and projecting laterally from the elongated lever arm 38 is an arm 42 which carries a ball member 43 adjacent the free end thereof. As shown in FIG. 6, the ball 43 engages an upwardly opening recess 44 provided in a member 46 which is adapted for rotation about a pivot pin 47. The pivot pin 47 is secured to the depending member 29 by a suitable nut 48. Formed integrally with the member 46 is a depending pointer 49 which is adapted to extend alongside the scales 31 provided on the depending member 29.

As shown in FIG. 4, the scale 31 is provided with a zero mark and marks at both sides thereof to indicate toe-in or toe-out, as the case may be. Preferably, a plurality of vertically spaced scales are provided on the member 29, as shown in FIG. 4, whereby the apparatus is adapted for use on wheels of various diameters. That is, by employing a plurality of individual scales alongside the pointer, a scale may be selected at the proper pointer length to acommodate various size wheels. Where more than one scale 31 is employed the pointer 49 is made of a transparent material having a hair line 50 whereby the portion of the scale 31 beneath the pointer 49 may be seen. Preferably, the point 49 is made of a material that magnifies the indicia beneath the same.

Extending between the forward ends of the arms 16 is an elongated member 51 having longitudinally extending slots 52 therein for receiving the pins 21 with a sliding fit. Other longitudinally extending slots 53 are provided in the elongated member 51 inwardly of the slots 52 in position to receive upstanding pins 54 carried by the free end of the elongated lever 38. That is to say, the pin 54 is secured to the end of the elongated lever 38 opposite the end thereof which is pivotally supported by the pin 37. Accordingly, the elongated lever arm 38, together with the laterally projecting member 42 define a generally L-shaped lever arm which is adapted for rotation about the pivot pin 37.

From the foregoing description, the operation of my improved apparatus will be readily understood. The magnetic chucks 14 are attached to the outer machined faces of the hubs 13 and the legs 17 are adjusted relative to the arms 16 whereby the arms 16 are supported in a horizontal plane. The elongated member 51 is positioned over the pins 21 and 54, as shown in FIG. 1, whereby the upstanding pins 21 project upwardly through the elongated openings 52 while the upstanding pins 54 project upwardly through the elongated openings 53. Where there is no toe-in or toe-out, the pointer 49 is in register with the zero marking on the scales 31. That is, in this position, the pins 21 and 54 are in alignment with each other whereby they lie in a common plane which is parallel to the elongated slots 52 and 53. With the pins 21 and 54 thus in alignment with each other, there is no movement of the laterally projecting member 42 to displace the pointer 49 relative to the zero marking on the scale 31.

On the other hand, where there is toe-in or toe-out, the arm 16 is moved out of alignment with the elongated member 51 whereby pins 21 and 54 no longer lie in a common plane which is parallel to the elongated slots 52 and 53. This movement of arm 16 out of alignment with elongated member 51 and out of parallel alignment with the elongated openings 52 and 53 causes the laterally projecting member 42 to be moved with respect to arm 16. The laterally projecting member 42 is moved toward the left, as viewed in FIG. 6, when there is toe-out on the left front wheel. Accordingly, upon movement of the ball 43 toward the left, as viewed in FIG. 6, the pointer 49 moves toward the right and away from the zero marking to thus indicate toe-out.

The laterally projecting member 42 is moved in the opposite direction, or toward the right, as viewed in FIG. 6, when there is toe-in on the left front wheel. Movement of the laterally projecting member 42 and the ball 43 toward the right thus moves the pointer 49 toward the left to indicate toe-in on the scale 31.

The operation of the device for the right wheel of the vehicle is in the same manner as the apparatus shown in FIG. 6 whereby toe-in or toe-out, as the case may be, is indicated continuously. Accordingly, the operator can determine the exact amount of toe-in or toe-out by merely looking at the scales 31 for the front wheels 11 and 12. Preferably, the vehicle is raised and lowered after adjustments have been made so as to determine whether or not the vehicle steering mechanism is out of proper alignment.

Referring now to FIG. 8 of the drawings, I show a modified form of my invention in which the laterally projecting member 42 actuates a potentiometer indicated generally at 56. The potentiometer is operatively connected to a galvanometer 57 whereby any movement of the laterally projecting member 42 away from zero is indicated on the galvanometer. Accordingly, by providing a potentiometer 56 and a galvanometer 57 for each of the laterally projecting members 42 the toe-in or toe-out is readily indicated on the galvanometers. It will also be apparent that other means of measuring the deflection of the outwardly projecting member 42 may be employed, if desired.

Referring now to FIGS. 9 and 10 of the drawings, I show a still further modified form of my invention in which an elongated flexible member 58 connects the pins 21 to each other. The intermediate portion of the flexible member 58 engages the upstanding pins 54 whereby the flexible member 58 forms a straight edge alongside the upstanding pins 21 and 54. Connected to the central portion of the flexible member 58 is a weight 59 which applies a slight tension on the flexible member to thereby maintain the same in a straight line. The operation of the apparatus shown in FIGS. 9 and 10 is substantially the same as the operation of the apparatus shown in FIGS. 1–7.

From the foregoing, it will be seen that I have devised an improved means for measuring toe-in and toe-out. By providing upstanding pins at the forward ends of supporting arms 16 which engage elongated slots in the elongated member 51, together with the upstanding pins 54 carried by the lever arm 38, toe-in or toe-out is indicated immediately upon the pin 21 being moved out of alignment with the upstanding pin 54. By providing means for continuously indicating the amount of toe, together with the provision of indicating means which faces the vehicle being tested, the toe-in- or toe-out for either or both of the wheels may be observed by the operator while the necessary adjustments are being made. Accordingly, the operator does not have to leave his working position in order to determine whether or not he has made the correct adjustment and how much his adjustment was off. Furthermore, by providing means for transposing linear movement of the laterally projecting member 42 into angular movement of the pointer 42, accurate measurements of the toe-in- or toe-out are indicated on the scale 31 at all times.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:
1. A toe gauge for the front wheels of a vehicle comprising:
 (a) a pair of arms,
 (b) means to secure each arm removably to a front wheel in position for an arm to project forwardly of each of the front wheels,
 (c) a pin carried by a forward portion of each of said arms and projecting therefrom,
 (d) an elongated member disposed to extend between the forward ends of said arms and having longi- tudinally extending slots therein disposed to receive said pins with a sliding fit,
(e) a lever arm adjacent each of said pins with each lever arm being mounted for pivotal movement adjacent one end thereof about a point which is in axial alignment with its associated pin,
(f) an outwardly projecting pin carried by the other end of each lever arm,
(g) there being other longitudinally extending slots in said elongated member in position to receive with a sliding fit said outwardly projecting pins carried by said other end of each lever arm, and
(h) means operatively connected to each lever arm and operable in response to relative movement between said arms and said elongated member to indicate toe.

2. A toe gauge as defined in claim 1 in which each arm of said pair of arms extends forwardly in front of the vehicle wheel adjacent thereto.

3. A toe gauge as defined in claim 1 in which said pair of arms are magnetically engaged with the machine-faced ends of the hubs of said wheels.

4. A toe gauge as defined in claim 3 in which the forward end of each arm of said pair of arms is provided with a depending adjustable support member for supporting said forward end.

5. A toe gauge as defined in claim 1 in which the means operatively connected to each lever arm and operable in response to relative movement between said arms and said elongated member to indicate toe comprises:
(a) a laterally projecting member carried by each lever arm, and
(b) a toe indicator member operatively connected to said laterally projecting member in position to indicate continuously the amount of relative movement between said arms and said elongated member from a predetermined position.

6. A toe guage as defined in claim 5 in which the toe indicator member comprises:
(a) a pointer operatively connected to the end of said laterally projecting member and adapted to rotate in response to movement of said laterally projecting member whereby linear movement of said laterally projecting member is transposed to angular movement of said pointer, and
(b) a scale mounted alongside said pointer in position to indicate the amount of movement of said pointer from a predetermined position.

7. A toe gauge as defined in claim 6 in which said scale is mounted in position to face the vehicle being tested whereby the scale is adapted to be read by an operator as toe adjustments are made.

8. A toe gauge as defined in claim 6 in which there are a plurality of scales mounted alongside said pointer and spaced longitudinally thereof in position to accommodate wheels of different sizes.

9. A toe gauge as defined in claim 1 in which the means operatively connected to each lever arm to indicate toe comprises a potentiometer and a galvanometer connected thereto.

10. A toe gauge for the front wheels of a vehicle comprising:
(a) a pair of arms,
(b) means to secure each arm removably to a front wheel in position for an arm to project forwardly of each of the front wheels,
(c) a pin carried by a forward portion of each of said arms and projecting therefrom,
(d) an elongated member disposed to extend between the forward ends of said arms and having longitudinally extending slots therein disposed to receive said pins with a sliding fit,
(e) a lever arm adjacent each of said pins with each lever arm being mounted for pivotal movement adjacent one end thereof about a point which is in axial alignment with its associated pin,
(f) an outwardly projecting pin carried by the other end of each lever arm,
(g) there being other longitudinally extending slots in said elongated member in position to receive with a sliding fit said outwardly projecting pins carried by said other end of each lever arm,
(h) a laterally projecting member carried by each lever arm,
(i) a rotatable indicator member mounted for rotation adjacent the end of each laterally projecting member, and,
(j) a ball and socket-type connection between said rotatable indicator member and said laterally projecting member whereby linear movement of said laterally projecting member is transposed into angular movement of said indicator member to indicate toe.

11. A toe gauge as defined in claim 10 in which each lever arm and the laterally projecting member connected thereto define a generally L-shaped lever.

12. A toe gauge as defined in claim 10 in which the ball and socket-type connection is defined by a ball-like member carried by the end of said laterally projecting member, there being an upwardly opening recess in said rotatable indicator member for receiving said ball-like member.

13. A toe gauge for the front wheels of a vehicle comprising:
(a) a pair of arms,
(b) means to secure each arm removably to a front wheel in position for an arm to project forwardly of each of the front wheels,
(c) a pin carried by a forward portion of each of said arms and projecting therefrom,
(d) an elongated member disposed to extend between the forward ends of said arms alongside said pins,
(e) a lever arm adjacent each of said pins with each lever arm being mounted for pivotal movement adjacent one end thereof about a point which is in axial alignment with its associated pin,
(f) an outwardly projecting pin carried by the other end of each lever arm and disposed adjacent said elongated member, and
(g) means operatively connected to each lever arm and operable in response to relative movement between said arms and said elongated member to indicate toe.

14. A toe gauge as defined in claim 13 in which the elongated member is a flexible member extending alongside said pins.

15. A toe gauge as defined in claim 14 in which a weight is carried by the central portion of said flexible member to maintain tension thereon.

No references cited.

ISAAC LISANN, *Primary Examiner.*